United States Patent [19]
Kaige et al.

[11] Patent Number: 5,906,867
[45] Date of Patent: May 25, 1999

[54] ORIENTING METHOD OF A MAGNETIC RECORDING MEDIUM

[75] Inventors: Takumi Kaige; Masayasu Sato, both of Ichigai-machi, Japan

[73] Assignee: Kao Corporation, Tokyo, Japan

[21] Appl. No.: 09/041,307

[22] Filed: Mar. 12, 1998

[30] Foreign Application Priority Data

Mar. 13, 1997 [JP] Japan .................................. 9-076705

[51] Int. Cl.[6] .................................................. B29C 35/08
[52] U.S. Cl. ............................................ 427/599; 427/128
[58] Field of Search ........................... 427/599, 128–132

[56] References Cited

U.S. PATENT DOCUMENTS

| | | | |
|---|---|---|---|
| 4,678,682 | 7/1987 | Asai et al. .............................. | 427/48 |
| 4,931,309 | 6/1990 | Komatsu et al. ........................ | 427/48 |
| 4,999,217 | 3/1991 | Watanabe et al. ....................... | 427/48 |
| 5,122,414 | 6/1992 | Shimizu et al. ........................ | 428/323 |
| 5,633,050 | 5/1997 | Shibata et al. ......................... | 427/548 |

FOREIGN PATENT DOCUMENTS 2-265672  10/1990  Japan .
5-73883  3/1993  Japan .

*Primary Examiner*—Bernard Pianalto
*Attorney, Agent, or Firm*—Oblon, Spivak, McClelland, Maier & Neustadt, P.C.

[57] ABSTRACT

The present invention includes one pair of magnetic field straightening plates made from a high magnetically permeable material disposed about the passage area of a base film at the outlet side of an orienting device so as to form a gap between the magnetic field straightening plates and the outlet of the orienting device.

6 Claims, 5 Drawing Sheets

F I G. 1
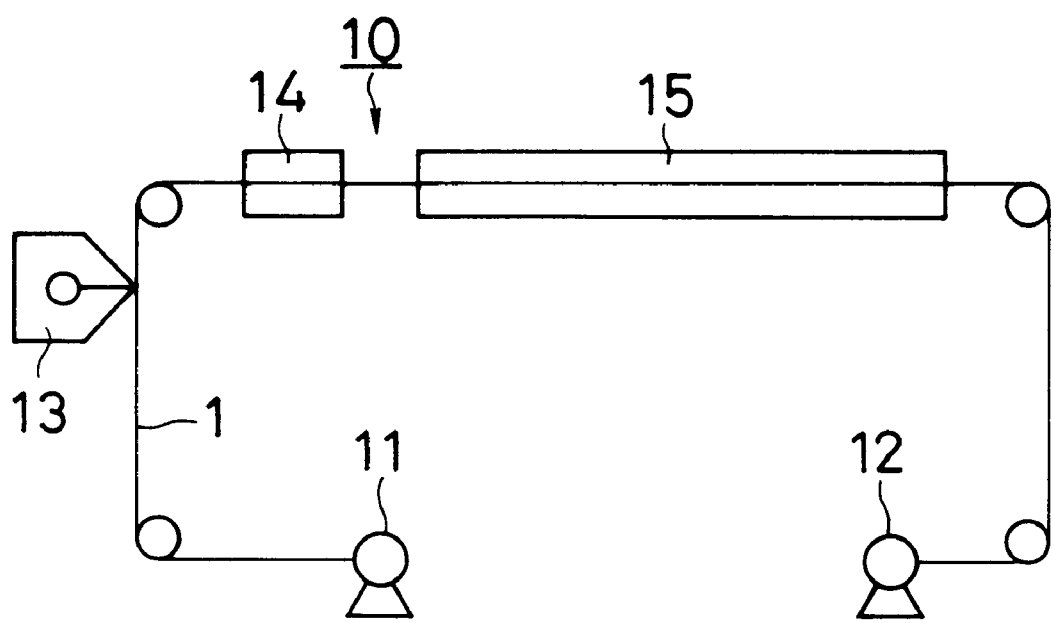

F I G. 5
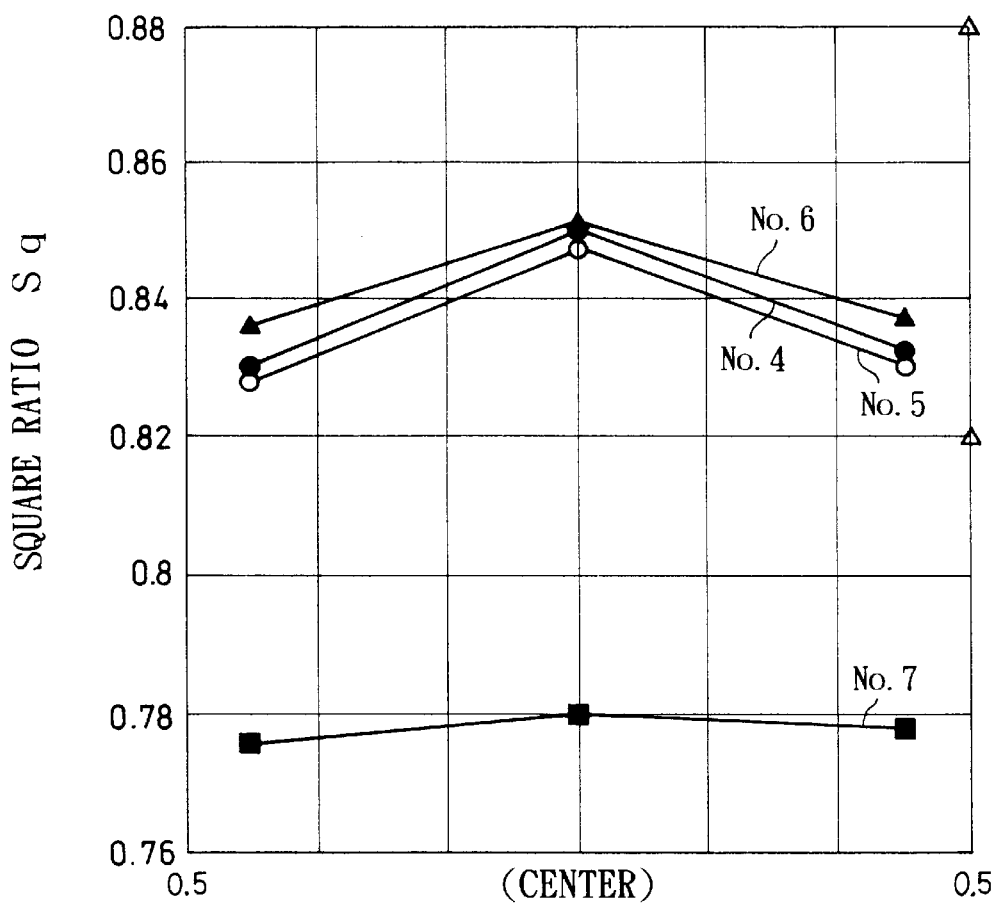
POSITION IN THE COATING FILM WIDTH DIRECTION X mm WITH RESPECT TO THE ENTIRE WIDTH L mm (X/L)

5,906,867

ORIENTING METHOD OF A MAGNETIC RECORDING MEDIUM

BACKGROUND OF THE INVENTION

1. Field of the Invention

The present invention relates to an orienting method of a magnetic recording medium.

2. Description of the Related Art

A magnetic recording medium is prepared as a product by running a base film, applying a magnetic coating on the base film, putting the base film applied with the magnetic coating through an orienting device so as to orient magnetic particles in the magnetic coating, drying it with a drier, winding it on a winding core, forming slits according to the product width, and further, cutting it according to the product length, and winding it on a spool.

However, the following problems are involved in the conventional orienting method of a magnetic recording medium:

(i) Magnetic flux leakage generated at the output side of the orienting device face outside at both end portions in the coated film width direction of the base film so that a magnetic field cannot be applied evenly on the base film in the coated film width direction. As a result, the orientation of the magnetic particles is disturbed at both end portions in the coated film width direction of the base film (FIG. 3B). Therefore, an even square ratio cannot be obtained in the coated film width direction of the base film so that it is difficult to maintain a stable output.

(ii) Since a higher recording density of a magnetic recording medium causes a decrease of the number of magnetic particles corresponding to a unit recording wavelength, a sufficiently high output needs to be ensured stably with a small number of magnetic particles. This means that an even high square ratio needs to be ensured in the coated film width direction of the base film.

SUMMARY OF THE INVENTION

An object of the present invention is to achieve an orientation such that an even square ratio can be obtained in the coated film width direction of the base film in a magnetic recording medium to ensure a stable output.

Furthermore, another object of the present invention is to achieve an orientation such that an even high square ratio can be obtained in the coated film width direction of the base film in a magnetic recording medium of a high recording density to ensure a stable high output.

The present invention is an orienting method of a magnetic recording medium comprising the steps of running a base film, applying a magnetic coating on the base film, and passing the base film applied with the magnetic coating through an orienting device so as to orient magnetic particles in the magnetic coating, wherein at least one pair of magnetic field straightening plates made from a high magnetically permeable material are disposed about the base film passage area at the outlet side of the orienting device so as to form a gap between the magnetic field straightening plates and the outlet of the orienting device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic diagram showing a magnetic recording medium producing apparatus;

FIG. 5 is a distribution chart of the square ratios in the coated film width direction obtained in Experiments 4 to 7.

DESCRIPTION OF THE PREFERRED EMBODIMENTS

Figure 2A:
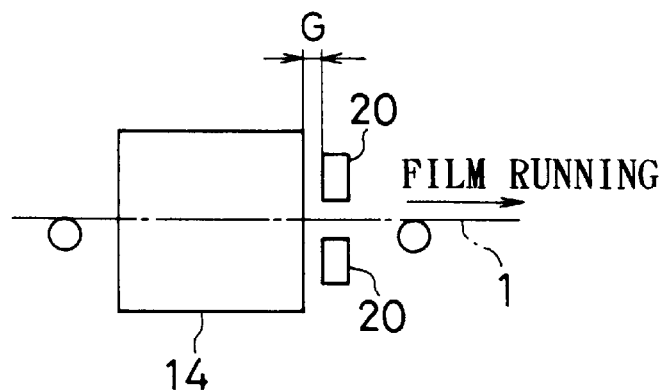
FIGS. 2A, 2B and 2C are schematic diagrams showing an orienting device.

As shown in FIG. 1, a magnetic recording medium producing apparatus 10 comprises an unwinding device 11 and a winding device 12 (running device), with an applying device 13, an orienting device 14, and a drying device 15 provided along the conveying line of a base film 1. The orienting device 14 can either be a solenoid or a permanent magnet, and further, can either be the AC orientation type or the DC orientation type. Accordingly, the magnetic recording medium producing apparatus 10 can coat a magnetic coating on the surface of the base film 1 using the applying device 13, orient magnetic particles in the coated film in the longitudinal direction of the base film 1 using the orienting device 14, and further, dry using the drying device 15.

Figure 2B:
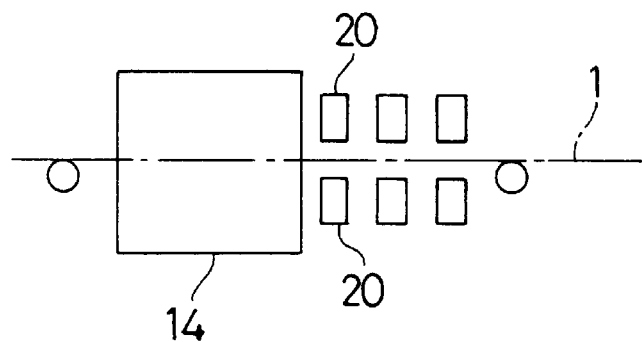
Figure 2C:
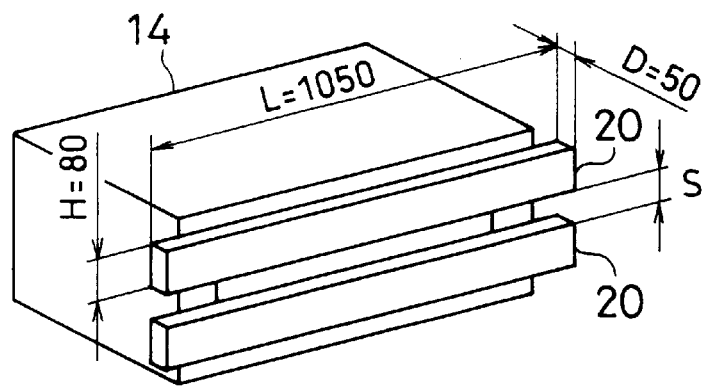

In the orienting device 14, as shown in FIGS. 2A, 2B and 2C, at least one pair of magnetic field straightening plates 20, 20 made from a high magnetically permeable material with an interval S therebetween are disposed about the passage area of the base film 1 at the outlet side of the orienting device 14 so as to form a gap G between the magnetic field straightening plates 20 and the outlet of the orienting device 14. The interval S between the magnetic field straightening plates 20 and the gap G are adjustable by means of an adjusting device (not shown). The magnetic field straightening plates 20 have a square bar-like shape, with a width L, a height H, and a length D (for example, L=1050 mm, H=80 mm, D=50 mm).

The width L is, in general, the same as or longer than the width of the orienting device. The height H and the length D can practically be from several mm to several hundred mm. However, the upper limit of the size is not particularly determined in the present invention. Further, the straightening plates can be juxtaposed as shown in FIG. 2B, or can be simplified as shown in FIG. 2A.

As a material for a magnetic field straightening plate of the present invention, a soft magnetic material, which has a small hysteresis loss, is often used. Examples thereof include iron, silicon steel, and pure iron, but are not limited thereto.

According to the orienting device 14, the following effects can be provided.

Figure 3A:
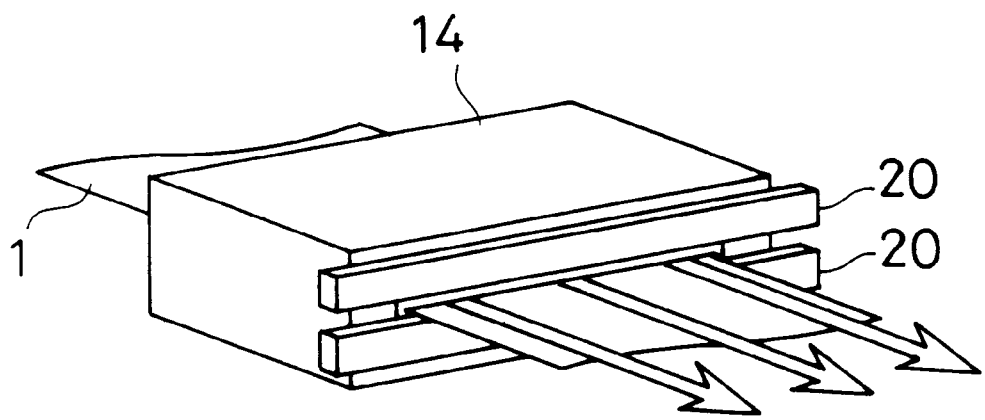
FIGS. 3A and 3B are schematic diagrams showing the orientation of the magnetic fluxes (lines of magnetic force) generated at the outlet side of the orienting device.
Figure 3B:
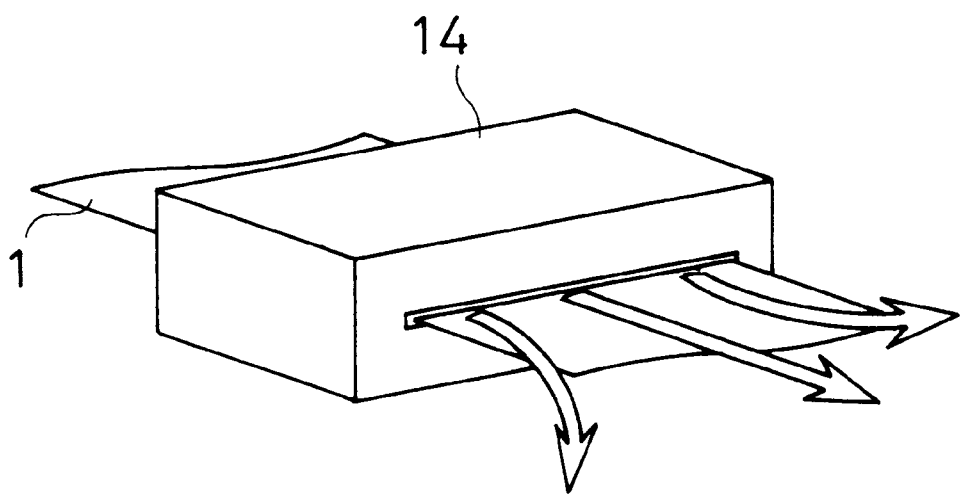

(i) By providing one pair of magnetic field straightening plates 20 at the outlet side of the orienting device 14, magnetic flux leakage generated at the outlet side of the orienting device 14 can be oriented in the longitudinal direction of the base film (base material) 1 so as to apply a magnetic field evenly in the coating film width direction of the base film 1. As a result, the orientation of the magnetic particles can be aligned in the same direction in the coated film width direction of the base film 1 (FIG. 3A). Accordingly, the square ratio can be uniform in the coated film width direction of the base film 1 so that a stable output can be ensured.

(ii) By having the initial magnetic permeability of 150 or more, the coercive force of 100 (AT/m) or less, and the relative maximum magnetic permeability of 5000 or more in the magnetic field straightening plates 20, with the interval S of the pair of the magnetic field straightening plates 20 for interposing the passage area of the base film being 1 of 160 mm or less, and the gap G formed between the magnetic field straightening plates 20 and the outlet of the orienting device being 14 of 100 mm or less, variation of the square ratios of the base film 1 in the coated film width direction can be reduced securely and homogenized.

(iii) By adopting the present invention and at the time having the square ratio of a magnetic recording medium to be high, that is, 0.82 or more, an orientation to obtain an even high square ratio in the coated film width direction of the base film 1 in a magnetic recording medium with a high recording density can be achieved, ensuring a stable high output.

For example, (A) and (B) below can be adopted as a configuration of a magnetic recording medium produced by the present invention, and a production method.

(A) Configuration of a magnetic recording medium

A magnetic recording medium of the present invention comprises a nonmagnetic base film, a magnetic layer on the nonmagnetic base film or the magnetic layer as the uppermost layer on an intermediate layer, which is on the nonmagnetic base film. Further, a back coat layer can be provided on the rear side of the nonmagnetic base film as needed.

In addition to the above-mentioned nonmagnetic base film, the above-mentioned intermediate layer, the above-mentioned magnetic layer, and the above-mentioned back coat layer, another layer such as a primer layer may be provided between the nonmagnetic base film and the intermediate layer or the back coat layer, and another magnetic layer may be provided for recording a servo signal corresponding to the hardware system for using a long wavelength signal, can be included in a magnetic recording medium of the present invention.

In a magnetic recording medium produced by an apparatus of the present invention, the magnetic layer on the nonmagnetic base film and the magnetic layer on the intermediate layer are provided as a layer on the surface of the magnetic recording medium, which can be formed by applying a magnetic coating on the nonmagnetic base film or the intermediate layer.

A magnetic recording medium of the present invention is preferably in the form of magnetic tape, such as 8 mm video tape, or DAT tape. It can also be used as another magnetic recording medium such as a floppy disk.

(B) Production method of a magnetic recording medium

First, a magnetic coating was applied on the above-mentioned nonmagnetic base film. For the above-mentioned applying method, an applying device disclosed in the official gazette of Japanese Patent Application Laid Open (JP-A) No. 2-265672 can be used.

Then, a magnetic field orienting treatment and a drying treatment are applied to the coated film. Then the film is wound. After a calendar treatment, a back coat layer is further formed as needed. As needed, an aging treatment is applied, for example, in the case of obtaining a magnetic tape, at 40 to 70° C. for 6 to 72 hours. Then slit are formed according to a desired width.

As the above-mentioned applying method, a simultaneous laminate layer applying method disclosed in column 42, line 31 of the official gazette of Japanese Patent Application Laid Open (JP-A) No. 5-73883 can be used. In the method, the magnetic coating for forming the magnetic layer is applied before the magnetic or nonmagnetic coating for forming the intermediate layer is dried. Since the border surface between the intermediate layer and the magnetic layer becomes smooth and the surface property of the magnetic layer becomes good, a magnetic recording medium with little dropout, capable of handling high density recording, and having an excellent durability of the coated film (intermediate layer and magnetic layer) can be obtained.

The above-mentioned magnetic field orienting treatment is conducted before the magnetic or nonmagnetic coating and the magnetic coating are dried. For example, in the case where a magnetic recording medium of the present invention is a magnetic tape, this can be conducted by a method of applying a magnetic field of about 500 Oe or more, preferably about 100 to 10000 Oe in a direction parallel to the surface of applying the magnetic coating, or by a method of passing the tape through a solenoid of 1000 to 10000 Oe while the magnetic or nonmagnetic coating and the magnetic coating are still in the wet state.

The above-mentioned drying treatment can be conducted, for example, by supplying a heated gas. In this case, the drying degree of the coated film can be controlled by controlling the gas temperature and the supply amount thereof.

The above-mentioned calendar treatment can be conducted by a super calendar method by passing through two rolls such as a metal roll and a cotton roll or a synthetic resin roll, or two metal rolls.

The above-mentioned back coat layer provided as needed is to be disposed on the rear side (the surface where the intermediate layer and the magnetic layer are not provided) of the nonmagnetic base film. In general, it can be obtained by applying a back coat coating on the nonmagnetic base film.

In the production of a magnetic recording medium of the present invention, a finishing process such as abrasion of the magnetic layer surface or cleaning can be applied as needed. For the application of the magnetic or nonmagnetic coating and the magnetic coating, a known consecutive laminate layer applying method can also be adopted.

EXAMPLES (1) A magnetic coating of the proportion shown in Table 1 was stirred, dispersed and diluted with a solvent of methyl ethyl ketone/toluene/cyclo hexanone=3/3/1 (weight ratio) such that the solid component concentration before application becomes about 35%. Then 4.0 parts of polyisocyanate-containing (Coronate HX) was added to the coating as a hardener.

Figure 4:
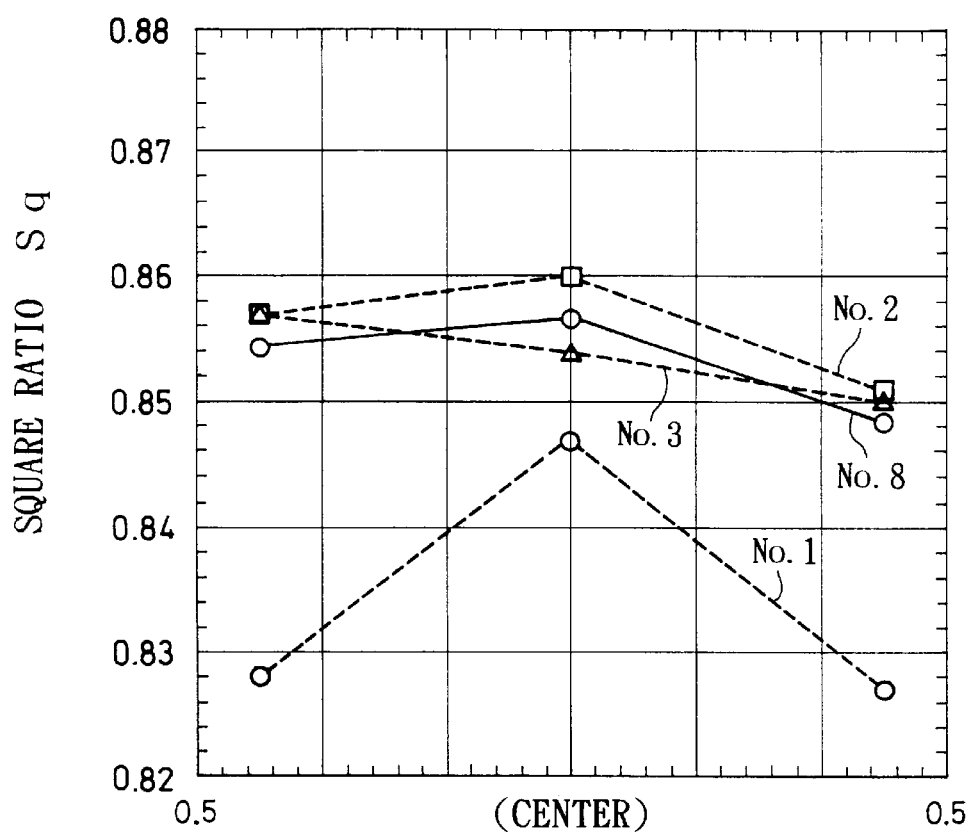
FIG. 4 is a distribution chart of the square ratios in the coated film width direction obtained in Experiments 1 to 3 and 8.

(2) By applying the above-mentioned coating (1) to a base film, conducting an orienting treatment with an orienting device of the present invention, and further by a certain calendar treatment, a magnetic recording medium having a 2.0 $\mu$m film thickness was obtained. After slitting the magnetic recording medium by ½ inch, the static magnetic characteristic (square ratio) was examined. Further, the output characteristic was evaluated to obtain the results shown in FIGS. 4, 5, and Table 2.

Experiments 1 to 3

These are experiments for seeking the appropriate value for the interval S between the magnetic field straightening plates 20.

An interval S between the magnetic field straightening plates 20, 20 of 160 mm or less is effective in homogenizing the square ratios in the coated film width direction. That is, the appropriate value of the interval S is 160 mm or less according to Experiments 2, 3.

Experiments 4, 5

These are experiments for seeking the appropriate value for the gap G between the outlet of the orienting device and the magnetic field straightening plates 20.

Even if the interval S between the magnetic field straightening plates 20, 20 is 160 mm or less, an effect of homogenizing the square ratios in the coated film width direction cannot be achieved with a gap G of 150 mm. That is, the appropriate value of the gap G is 100 mm or less according to Experiments 2, 3.

Experiment 6

This is an experiment for comparing the material comprising the magnetic field straightening plates 20.

The material comprising the magnetic field straightening plates 20 needs to be capable of containing the magnetic flux leakage from the orienting device to the outside, and have a low coercive force not magnetizing the same. Therefore, nickel of a low magnetic permeability (relative initial magnetic permeability 110) is not appropriate. That is, it is preferable that the material comprising the magnetic field straightening plates 20 has a relative initial magnetic permeability of 150 or more. For example, a high magnetically permeable silicon steel (relative initial magnetic permeability 1500) used in Experiments 2, 3 is appropriate.

Experiment 7

Experiment 7 is the case of a low square ratio, and Experiments 2, 3 are the cases of a high square ratio. The homogenizing effect of the square ratios of the present invention is effective in either a low square ratio or a high square ratio.

Experiment 8

An experiment was conducted with a different kind of magnetic field straightening plates, and an effect was observed. From the iron material, an effect of the present invention with the initial magnetic permeability of 150, the coercive force of 100 (AT/m), and the relative maximum magnetic permeability 5000 was confirmed.

Although embodiments of the present invention have been described with reference to drawings, the tangible configuration of the present invention is not limited thereto. However, a change or modification of the design within the gist of the present invention is embraced therein.

As heretofore mentioned, according to the present invention, a magnetic recording medium can be oriented so as to obtain an even square ratio in the coated film width direction of the base film for ensuring a stable output.

Furthermore, according to the present invention, a magnetic recording medium of a high recording density can be oriented so as to obtain an even high square ratio in the coated film width direction of the base film for ensuring a stable high output.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood to be limited to the specific embodiment set out above but to include all possible embodiments and equivalents thereof as set out in the appended claims.

TABLE 1

|  | Proportion part number |
|---|---|
| Magnetic powders | 100 |
| Carbon black | 1.6 |
| α-alumina | 7.0 |
| Copolymer of vinyl chloride | 11.0 |
| Polyurethane resin | 9.0 |
| Myristic acid | 3.0 |
| Butyl stearate | 1.0 |

TABLE 2

| | Orienting device | | Results Square ratio | | | Square ratio | | |
|---|---|---|---|---|---|---|---|---|
| Experiment number | Interval S mm | Gap G mm | Minimum | Maximum | Variation with respect to the average value % | Average value % | Material | Note |
| 1 | 300 | 100 | 0.826 | 0.846 | 2.4 | 0.833 | Silicon steel | Orientation magnetic force 8000 Oe |
| 2 | 24 | | 0.851 | 0.860 | 0.3 | 0.856 | | |
| 3 | 156 | | 0.850 | 0.857 | 0.8 | 0.854 | | |
| 4 | 24 | 150 | 0.830 | 0.850 | 2.4 | 0.837 | | |
| 5 | 156 | | 0.828 | 0.847 | 2.3 | 0.835 | | |
| 6 | 24 | 50 | 0.836 | 0.851 | 1.8 | 0.842 | Nickel | |
| 7 | 24 | 50 | 0.778 | 0.780 | 0.3 | 0.779 | Silicon steel | Orientation magnetic force 3000 Oe |
| 8 | 24 | 100 | 0.848 | 0.856 | 0.9 | 0.853 | Iron | Orientation magnetic force 8000 Oe |

Note: The relative initial magnetic permeability of silicon steel was 1500, and nickel 110. The variation with respect to the average value was sought by (maximum value of the square ratio in the original width direction - minimum value)/square ratio average value × 100(%).

What is claimed as new desired to be secured by Letters Patent of the United States is:

1. An orienting method of a magnetic recording medium, comprising the steps of:

applying a magnetic coating on a base film;

passing the base film applied with the magnetic coating through an orienting device so as to orient magnetic particles in the magnetic coating; and orienting a magnetic flux leakage generated at an outlet side of said orienting device in a longitudinal direction of the base film by disposing at the outlet side of the orienting device at least one pair of magnetic field straightening plates comprising a high magnetically permeable material so as to form a gap between the magnetic field straightening plates and the outlet side of the orienting device.

2. The orienting method of a magnetic recording medium according to claim 1, wherein in said step of orienting said magnetic flux leakage;

said at least one pair of magnetic field straightening plates comprises an initial permeability of 150 or more, a coercive force of 100 (AT/m) or less, and a relative maximum magnetic permeability of 5000 or more;

an interval between the at least one pair of the magnetic field straightening plates is 160 mm or less; and the gap formed between the magnetic field straightening plates and the outlet of the orienting device is 100 mm or less.

3. The orienting method of a magnetic recording medium according to claim 2, wherein a square ratio of the magnetic recording medium is 0.82 or more.

4. The orienting method of a magnetic recording medium according to claim 1, wherein a square ratio of the magnetic recording medium is 0.82 or more.

5. The orienting method of a magnetic recording medium according to claim 1, wherein in said step of orienting said magnetic flux leakage said magnetic field straightening plates are disposed about a base film passage area at the outlet side of the orienting device.

6. An orienting method of a magnetic recording medium, comprising the steps of:

applying a magnetic coating on a base film;

passing the base film applied with the magnetic coating through an orienting device so as to orient magnetic particles in the magnetic coating; and orienting a magnetic flux leakage generated at an outlet side of said orienting device in a longitudinal direction of the base film by disposing upward and downward in a width direction of the base film and at the outlet side of the orienting device at least one pair of magnetic field straightening plates comprising a high magnetically permeable material so as to form a gap between the magnetic field straightening plates and the outlet side of the orienting device.

* * * * *